(12) United States Patent
Ishida et al.

(10) Patent No.: US 6,815,030 B2
(45) Date of Patent: Nov. 9, 2004

(54) OPTICAL INFORMATION RECORDING MEDIUM

(75) Inventors: Toshio Ishida, Kanagawa (JP); Takeshi Kakuta, Kanagawa (JP); Shinichi Kato, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/158,853

(22) Filed: Jun. 3, 2002

(65) Prior Publication Data

US 2003/0017295 A1 Jan. 23, 2003

(30) Foreign Application Priority Data

Jun. 4, 2001 (JP) ........................................ 2001-168274

(51) Int. Cl.⁷ ................................................ B32B 3/02
(52) U.S. Cl. .................... 428/64.1; 428/64.4; 428/64.8; 430/270.14
(58) Field of Search ................................ 428/64.1, 64.4, 428/64.8, 913; 430/270.14, 495.1, 945; 369/283, 288

(56) References Cited

U.S. PATENT DOCUMENTS 6,461,711 B1 * 10/2002 Ishida ...................... 428/64.1
6,475,588 B1 * 11/2002 Schottland ................. 428/64.1

FOREIGN PATENT DOCUMENTS

| EP | 1 239 468 A2 | 9/2002 |
| JP | 1-298546 A | 12/1989 |
| JP | 11-53758 A | 2/1999 |
| JP | 11-031337 | 2/1999 |
| JP | 11-120617 | 4/1999 |
| JP | 11-149666 A | 6/1999 |
| JP | 2000-285520 | 10/2000 |
| JP | 2000-311392 | 11/2000 |

OTHER PUBLICATIONS

Database WPI Section EI, Week 199803 Derwent Publications Ltd., London,, GB; AN1998–029898 XP002266103 & JP 09 288847 Nov. 4, 1997, Abstract.
European Search Report.
Patent Abstracts of Japan, 11053758, vol. 1999, No. 05.
Patent Abstracts of Japan, 11149666, vol. 1999, No. 11.
Patent Abstracts of Japan, 01298546, vol. 014, No. 092.
"International Symposium on Optical Memory 2000", Auditorium, Chitose Institute of Science and Technology, Chitos, Hokkaido, Japan, Sep. 5–8, 2000.

* cited by examiner

*Primary Examiner*—Elizabeth Mulvaney
(74) *Attorney, Agent, or Firm*—Sughrue Mion, PLLC

(57) ABSTRACT

An optical information recording medium achieving stable recording and reading characteristics and having good storage stability including light resistance and heat resistance by preventing colorants contained in a recording layer therein from being decomposed, and also an optical information recording medium that can be individually differentiated from others by outward appearance. The optical information recording medium includes a substrate having successively disposed thereon at least a light-reflective layer, a recording layer on which information is recorded by laser light of a wavelength no longer than 500 nm, and a cover layer containing a UV absorbent that blocks out light of a wavelength no longer than 400 nm and/or a dye that blocks out light of a wavelength no shorter than 500 nm. A second substrate may be disposed opposite to a side of the optical information recording medium that is irradiated with light and may be colored.

18 Claims, 3 Drawing Sheets

OPTICAL INFORMATION RECORDING MEDIUM

BACKGROUND OF THE INVENTION

1. Field of the Invention

The present invention relates to an optical information recording medium, and in particular to improvements in heat-mode writable optical information recording media.

2. Description of the Related Art

A CD-R is a widely known writable optical information recoding medium (optical disc) on which information can be written only once by irradiation with laser light. A CD-R typically has a recording layer containing an organic colorant, a light-reflective layer containing metals such as gold, and a protective layer composed of resins, laminated in this order on a transparent disc substrate. Information is recorded on the CD-R by irradiating it with near-IR laser light (generally having a wavelength of around 780 nm). Specifically, the recording layer of the optical disc absorbs light which causes a temperature increase at an exposed portion, resulting in a physical or chemical change (for example, formation of pits) and, in turn, a change in the optical properties of that portion, whereby information data are recorded at that portion. On the other hand, when reading data from the thus-recorded optical disc, the CD-R is, in general, irradiated with laser light having the same wavelength as that of the light used for information recording, and a difference in reflectance is detected between at the portions having (recorded area) and those not having (non-recorded area) the optical change produced in the recording layer.

Optical information recording media with higher density recording capabilities are desired these days. To meet this requirement, an optical disc of a different type, a writable digital versatile disc (DVD-R) has been proposed (for example, in a separate volume of *Nikkei New Media*, "DVD", published in 1995). A DVD-R is so constructed that two discs each having an organic colorant-containing recording layer, a light-reflective layer and a protective layer are laminated in this order on a transparent disc substrate are laminated with the recording layers of the two discs facing inside, or is so constructed that one recording disc of the type described above is laminated with a protective disc substrate having the same form as that of the recording disc, also with the recording layer facing inside. In the DVD-R, the transparent disc substrate is processed so as to have a narrow guide groove (pre-groove) for laser light tracking, and a width of the groove, which is, for example, from 0.74 to 0.8 µm is less than half as wide as that in a CD-R. Information recording and reading are performed by irradiating the DVD-R with visible laser light (generally having a wavelength within a range of from 630 nm to 680 nm), and higher density recording is possible than on a CD-R.

Recently, networks such as the internet and high-definition television (HDTV) are rapidly being popularized, and full-scale telecasting for HDTV is not far away. Given this situation, large-scale recording media capable of having image information recorded thereon at low cost and in a simple manner are needed. At present, the DVD-R may perform its role as a large-capacity recording medium, but demand for further increasing the recording capacity and density of recording media is now increasing more and more, and it is necessary to develop recording media that meet this demand. For this reason, a recording medium of higher capacity and capable of undergoing higher density recording by irradiation with light having a shorter wavelength than that used with DVD-Rs is now being developed.

For example, Japanese Patent Application Laid Open (JP-A) Nos. 4-74690, 7-304256, 7-304257, 8-127174, 11-53758, 11-334204, 11-334205, 11-334206, 11-334207, 2000-43423, 2000-108513, 2000-113504, 2000-149320, 2000-158818 and 2000-228028 disclose methods for recording and reading information by irradiating optical information recording media, having an organic colorant-containing recording layer, with laser light, having a wavelength no longer than 530 nm, from a recording layer side thereof toward the light-reflective layer side thereof. In these methods, an optical disc having a recording layer that contains any of porphyrin compounds, azo dyes, metal azo dyes, quinophthalone dyes, trimethinecyanine dyes, dicyanovinylphenyl skeleton-having dyes, coumarin compounds or naphthalocyanine compounds is irradiated with blue (430 nm, 488 nm) or blue-green (515 nm) laser light for recording information thereon and reading information therefrom.

From a viewpoint of compatibility with the current CD-R system, optical information recoding media capable of recording and reading via laser light of different two wavelength ranges are proposed. For example, JP-A Nos. 2000-141900, 2000-158816, 2000-185471, 2000-289342 and 2000-309165 propose optical information recording media capable of recording and reading with any laser light of a near-IR laser light range of around 780 nm or visible laser light range of around 650 nm, by mixing the colorants used in CD-Rs and those used in DVD-Rs.

However, the present inventors have found through investigation that sensitivity of the optical discs described in the above-mentioned patent publications is still not of a practical level when information is recorded thereon via irradiation with short-wave laser light of a wavelength no longer than 450 nm. In addition other recording characteristics such as reflectivity and modulation of the optical discs are not satisfactory, and therefore the optical discs must be further improved. In particular, present inventors have confirmed that recording characteristics of the optical discs described in the above-mentioned patent publications are poor when they are irradiated with laser light of no longer than 450 nm.

On a surface opposite to the substrate of the optical discs mentioned above, a transparent cover layer is generally formed. Since the cover layer absorbs short-wave or long-wave light, the colorants, such as phthalocyanine dyes, contained in the recording layer of the optical discs are decomposed over time by light that passes through the cover layer, and the storage stability of the optical discs is often inferior.

On the other hand, in fabricating a DVD, a tabular substrate having a thickness of, for example, 0.6 mm is adhered to a dummy substrate having a thickness of, for example, 0.6 mm, and necessary visible information and decoration for increasing commercial value are printed on the surface of the dummy substrate. This printing on the dummy substrate is carried out via various printing methods such as pad printing, screen printing or offset printing for full-color prints, and the same printing pattern is used for all recording discs produced on one production line.

As mentioned above, disc recording media are generally formed of a transparent polycarbonate resin. Therefore, if surfaces thereof do not have decoration or titles printed thereon, one can not be differentiated from another, and in addition, they leave an uninteresting impression and therefore Often have low commercial value. However, if the printing pattern is varied for every recording disc when a conventional pad printing or screen printing method is used, different printing plates must be prepared for all of the intended printing patterns, and this is costly and time consuming. Therefore, it is impossible to readily change the contents of the printing, and for prints of many colors, increased cost and complexity of the printing process represent another problem.

For these reasons, it is realistically difficult to print different patterns on different recording discs of the same type so as to individually differentiate them by the printed patterns, and thus the same pattern is printed on all of the recording discs of the same type.

SUMMARY OF THE INVENTION

One object of the present invention is to provide an optical information recoding medium having stable recording and reading characteristics and having good storage stability, including light resistance and heat resistance, by preventing colorants in a recording layer therein from being decomposed.

Another object of the invention is to make it possible to readily fabricate recording discs of different appearances that can be individually differentiated from each other and to thereby further increase the commercial value of the recording discs.

The above-stated objects are attained by the invention described below. Specifically, in a first aspect thereof, the invention provides an optical information recording medium having, on a substrate, at least a light-reflective layer, a recording layer on which information can be recorded via laser light of wavelength no longer than 500 nm, and a cover layer containing at least one of UV absorbents that block out light of wavelength no longer than 400 nm and dyes that block out light of wavelength no shorter than 500 nm, formed in this order.

In a second aspect thereof, the invention provides a disc recording medium having a recording layer on which information can be recorded and reading the recorded information can be reproduced via irradiation with light, wherein a substrate opposite to a disc surface that is irradiated with light contains a colorant material.

This makes it possible to readily fabricate recording discs of different appearances and to differentiate the individual discs from each other. In addition, the substrate opposite to the disc surface that is irradiated with light is colored. Printing of background color on the discs can therefore be omitted, and a printing step only requires printing necessary information thereon. Printing frequency can be reduced or printing can be completely omitted, thus simplifying the process of fabricating the recording discs.

If desired, the substrate opposite to the disc surface that is irradiated with light may contain two or more different colorant materials, and different patterns can be formed on different substrates. Accordingly, each optical disc recording medium may have a multi-color marble pattern, enhancing its appearance, and increasing its commercial value

DESCRIPTION OF THE PREFERRED EMBODIMENTS

Figure 1:
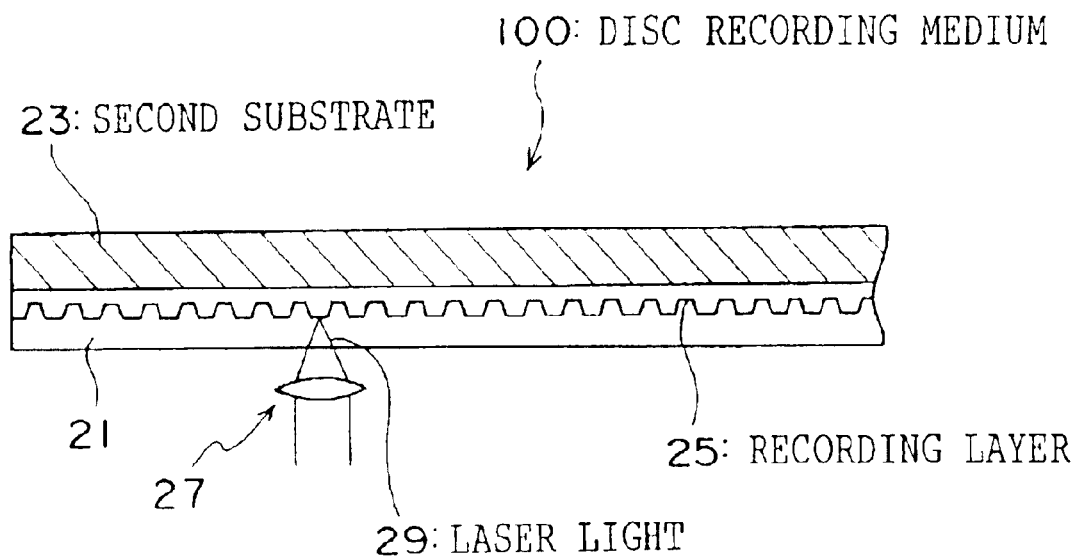
FIG. 1 is a partial vertical cross section of a single-sided disc-type DVD of, a first embodiment of an optical information recording medium of the present invention.

The optical information recording medium of the first aspect of the invention has a light-reflective layer, a recording layer and a cover layer formed on a substrate in this order. Preferably, an adhesive layer is formed between the recording layer and the cover layer for firmly adhering the two layers to each other.

The substrate and the constitutive layers are described below.

1. Substrate:

For the substrate, any and every material used for the substrates of conventional optical information recording media can be used in any desired manner.

Illustrative examples of the substrate materials include glass; polycarbonates; acrylic resins such as polymethyl methacrylate; vinyl chloride resins such as polyvinyl chloride, vinyl chloride copolymer; epoxy resins; amorphous polyolefins; polyesters; and metals such as aluminium. These materials may also be used in combination.

Among the materials described above, amorphous polyolefins and polycarbonates are preferable because of good moisture resistance, good dimensional stability and inexpensiveness. Most preferable are polycarbonates. Preferably, the thickness of the substrate is 1.1±0.3 mm.

On the substrate is formed a guide groove for tracking or a concavo-convex groove (pre-groove) indicating information such as an address signal.

For example, for DVR (high-density recording medium proposed by Sony, 22.5 GB/disc), it is preferable to use a substrate having provided thereon a per-groove with a narrower track pitch in order to achieve a higher recording density compared with that obtained by CD-R or DVD-R. The track pitch of the pre-groove is indispensably from 200 to 400 $\mu$m, and preferably from 250 to 350 $\mu$m. The depth of the pre-groove is indispensably from 40 to 150 nm, and preferably from 50 to 120 nm.

On the surface of the side of the substrate having formed thereon a light-reflective layer which will be described hereinunder, a subbing layer is preferably provided for improving the flatness and adhesiveness of the substrate.

Examples of the materials for producing the subbing layer include polymers such as polymethyl methacrylate, acrylic acid/methacrylic acid copolymer, styrene/maleic anhydride copolymer, polyvinyl alcohol, N-methylolacrylamide, styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, polyethylene, polypropylene, polycarbonate; and surface modifiers such as silane-coupling agents.

The subbing layer may be formed, for example, by dissolving or dispersing the above material in a suitable solvent to prepare a coating liquid, and then applying the coating liquid onto the surface of the substrate using any of coating methods such as spin coating, dip coating or extrusion coating. The thickness of the subbing layer is generally from 0.005 to 20 $\mu$m, and preferably from 0.01 $\mu$m to 10 $\mu$m.

2. Light-Reflective Layer:

The light-reflective layer includes a light-reflective substance having high laser reflectance. Preferably, the reflectance of the substance is at least 70%. Examples of the light-reflective substance of high reflectance include metals and semimetals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, Bi; as well as stainless steel. These substances may be used either singly or in combination of two or more. Alloys thereof may also be sued. Among these, preferable are Cr, Ni, Pt, Cu, Ag, Au, Al and stainless steel, and more preferable are Au, Ag, Al and their alloys, and most preferable are Au, Ag and their alloys.

The light-reflective layer may be formed on the substrate, for example, through vapor deposition, sputtering or ion plating of any of the above-mentioned light-reflective substances. The thickness of the light-reflective layer is generally from 10 nm to 300 nm, and preferably from 50 nm to 200 nm.

3. Recoding Layer:

The recording layer is formed on the light-reflective layer, and information can be recorded thereon by irradiation with laser light of a wavelength no longer than 600 nm. The recording layer contains a colorant. The colorant serving as a recording substance in the recoding layer may be any of phase-change metal compounds and organic compounds.

Examples of the organic compounds include cyanine dyes, oxonole dyes, metal complex dyes, azo dyes and phthalocyanine dyes.

The dyes described in JP-A Nos. 4-74690, 8-127174, 11-53758, 11-334204, 11-334205, 11-334206, 11-334207, 2000-43423, 2000-108513 and 2000-158818 may be suitably used.

The recording substance is not limited to such dyes, and other examples thereof include organic compounds such as triazole compounds, triazine compounds, cyanine compounds, merocyanine compounds, aminobutadiene compounds, phthalocyanine compounds, cinnamate compounds, viologen compounds, azo compounds, oxonole-benzoxazole compounds, and benzotriazole compounds. Among these compounds, particularly preferable are cyanine compounds, aminobutadiene compounds, benzotriazole compounds and phthalocyanine compounds.

The recording layer may be formed, for example, by dissolving the recording substance such as the dye, together with a binder, in a suitable solvent to prepare a coating liquid, applying the coating liquid on the surface of the substrate to form a film thereon, and then allowing the coating liquid to dry. The concentration of the recording substance present in the coating liquid is usually from 0.01 to 15% by weight, preferably from 0.1 to 10% by weight, more preferably from 0.5 to 5% by weight, most preferably from 0.5 to 3% by weight.

Examples of the solvent used for the coating liquid include esters such as butyl acetate, ethyl lactate, cellosolve acetate; ketones such as methyl ethyl ketone, cyclohexanone, methyl isobutyl ketone; chlorinated hydrocarbons such as dichloromethane, 1,2-dichloroethane, chloroform; amides such as dimethylformamide; hydrocarbons such as methylcyclohexane; ethers such as tetrahydrofuran, ethyl ether, dioxane; alcohols such as ethanol, n-propanol, isopropanol, n-butanol diacetone alcohol; fluorine-based solvents such as 2,2,3,3-tetrafluoropropanol; and glycol ethers such as ethylene glycol monomethyl ether, ethylene glycol monoethyl ether, propylene glycol monomethyl ether.

These solvents may be used either singly or in combination, depending on the solubility of the recording substance used. The coating liquid may further include as needed various additives such as an antioxidant, a UV absorbent, a plasticizer and a lubricant.

Examples of the binder include natural organic polymers such as gelatin, cellulose derivatives, dextran, rosin, rubber; and synthetic organic polymers, for example, hydrocarbon resins such as polyethylene, polypropylene, polystyrene, polyisobutylene, vinylic resins such as polyvinyl chloride, polyvinylidene chloride, polyvinyl chloride/polyvinyl acetate copolymers, acrylic resins such as poly(methyl acrylate), poly(methyl methacrylate), polyvinyl alcohol, polyethylene chloride, epoxy resins, butyral resins, rubber derivatives, and precondensates of a thermosetting resin such as phenol-formaldehyde resin. When the binder is used together with the recording substance, the amount of the binder in the recording layer is generally from 0.01 times to 50 times (mass ratio), preferably from 0.1 times to 5 times (mass ratio) the amount of the recording substance used. The concentration of the recording substance present in the coating liquid is generally from 0.01 to 10% by weight, preferably from 0.1 to 5% by weight.

The recording layer is formed by, for example, spraying, spin coating, dipping, roll coating, blade coating, doctor roll coating, or screen printing. The recording layer may be mono-layered or multi-layered. The thickness of the recording layer is generally from 20 nm to 500 nm, preferably from 30 nm to 300 nm, more preferably from 50 nm to 100 nm.

The recording layer may optionally include a variety of fading inhibitors to improve the light resistance of the recoded layer.

Singlet oxygen quenchers are usually employed as the fading inhibitor, and those described in patent and other publications may be used.

Their examples are described in JP-A Nos. 58-175693, 59-81194, 60-18387, 60-19586, 60-19587, 60-35054, 60-36190, 60-36191, 60-44554, 60-44555, 60-44389, 60-44390, 60-54892, 60-47069, 63-209995, 4-25492; JP-B Nos. 1-38680, 6-26028; German Patent No. 350,399; and the *Journal of the Chemical Society of Japan*, October 1992, page 1141.

The amount of the fading inhibitor such as a singlet oxygen quencher to be included in the recording layer is generally from 0.1 to 50% by weight, preferably from 0.5 to 45% by weight, more preferably from 3 to 40% by weight, even more preferably from 5 to 25% by weight of the colorant used.

4. Adhesive Layer:

The adhesive layer is an optional layer formed for improving the adhesiveness between the recording layer and the cover layer mentioned below.

The material for the adhesive layer is preferably a photocurable resin, more preferably that of low curing shrinkage for preventing the discs from warping. The photocurable resin of the type is, for example, a UV-curable resin (UV-curable adhesive) such as Dai-Nippon Ink's SD-640 and SD-347. For good elasticity thereof, the thickness of the adhesive layer is preferably from 1 to 1000 $\mu$m, more preferably from 5 to 500 $\mu$m, even more preferably from 10 to 100 $\mu$m.

5. Cover Layer:

The cover layer is formed for preventing water from penetrating into the optical information recording medium. The cover layer of the optical information recording medium of the invention can block out light of a wavelength no longer than 400 nm and/or light of a wavelength no shorter than 500 nm, and it prevents the dyes in the recording layer from being photodecomposed. Having the cover layer, therefore, the storage stability of the optical information recording medium of the invention is good.

The cover layer is not specifically defined so far as it is formed of a transparent material. Preferably, it is formed of a polycarbonate, an acrylic resin such as polymethyl methacrylate, a vinyl chloride resin such as polyvinyl chloride or vinyl chloride copolymer, an epoxy resin, an amorphous polyolefin, a polyester, or cellulose triacetate. More preferably, it is formed of a polycarbonate or cellulose triacetate.

The cover layer contains an UV absorbent for blocking out light of a wavelength no longer than 400 nm and/or a dye for blocking out light of a wavelength no shorter than 500 nm.

The wordage "transparent" means that it transmits recording light and reading light (transmittance: at least 90%) and is transparent to the light.

The UV absorbent includes benzothiazoles, tetrazaindenes, thiouracils, benzotriazoles and their derivatives, and they block out light of a wavelength no longer than 400 nm.

The dye includes phthalocyanine dyes, cyanine dyes, merocyanine dyes, azo dyes, immonium dyes, diimmonium dyes, pyrylium/thiopyrylium dyes, azulenium dyes, squalilium dyes, metal complex dyes with Ni or Cr, naphthoquinone dyes, anthraquinone dyes, indophenol dyes, indaniline dyes, triphenylmethane dyes, triallylmethane dyes, aluminium/diimmonium dyes and nitroso compounds, and they block out light of a wavelength no shorter than 500 nm.

Dyes of the following structural formula (1) or (2) also block out light of a wavelength no shorter than 500 nm, and are usable herein.

Structural Formula (1)

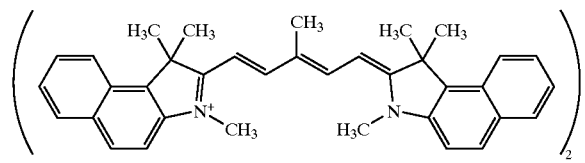

Structural Formula (2)

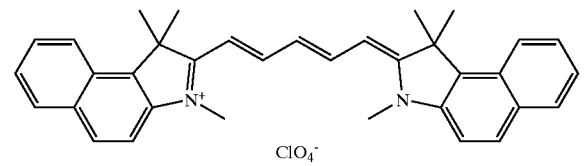

The UV absorbent and the dye may be added to the cover layer by kneading it with the material for the layer, or dissolving or dispersing it in the material.

Preferably, the UV absorbent content of the cover layer is from 0.001 to 80% by weight, more preferably from 0.1 to 50% by weight.

If the content is larger than 80% by weight, the absorbance of the cover layer will increase and the reflectance thereof will lower; but if smaller than 0.001% by weight, the UV absorbent will be ineffective.

Also preferably, the dye content of the cover layer is from 0.001 to 80% by weight, more preferably from 0.1 to 50% by weight.

If the content is larger than 80% by weight, the absorbance of the cover layer will increase and the reflectance thereof will lower; but if smaller than 0.001% by weight, the dye will be ineffective.

The cover layer is formed as follows: A photocurable resin to form an adhesive layer is dissolved in a suitable solvent to prepare a coating solution, the coating solution is applied onto the recording layer at a predetermined temperature to form a coating film thereon, a film substrate with a UV absorbent and/or a dye added thereto in the manner mentioned above is laminated over the coating film, and this is irradiated with light over it to cure the coating film.

The thickness of the cover layer is preferably from 0.01 to 0.2 mm, more preferably from 0.03 to 0.1 mm, even more preferably from 0.05 to 0.095 mm.

For viscosity control, the coating temperature ranges preferably from 23 to 50° C., more preferably from 24 to 40° C., even more preferably from 25 to 37° C.

For preventing the discs from being warped, the coating film is preferably irradiated with a pulse light emitter (more preferably, a UV emitter). The pulse interval is preferably not larger than the level of msec, more preferably not larger than the level of $\mu$sec. The quantity of light irradiation in one pulse is not specifically defined, but is preferably at most 3 kW/cm$^2$, more preferably at most 2 kW/cm$^2$.

The irradiation frequency is not also specifically defined, but is preferably at most 20 times, more preferably at most 10 times.

In the optical information recording medium of the invention, a dielectric layer or a light-transmitting layer may be formed between the light-reflective layer and the recording layer, depending on the characteristics of the recording layer. For example, when a recording layer is provided, a light-transmitting layer may be provided for improving the adhesiveness to the recording layer, and when a phase-change recording layer is provided, a dielectric layer may be provided for heat radiation.

The dielectric layer may be formed of a material of oxides, nitrides, carbides or sulfides of at least one of Zn, Si, Ti, Te, Sm, Mo and Ge, or their hybrids such as ZnS—SiO$_2$.

Not specifically defined, the light-transmitting layer may be formed of any and every material having a laser transmittance of at least 90%. For example, it may be formed of the same material as that for the dielectric layer mentioned above.

The dielectric layer and the light-transmittance layer may be formed in any known method. The thickness of the dielectric layer is preferably from 1 to 100 nm, and the thickness of the light-transmitting layer is preferably from 2 to 50 $\mu$m.

Embodiments of the disc recording medium, the second aspect of the invention are described below with reference to the drawings attached hereto.

FIG. 1 shows a part of the vertical cross section of a single-sided disc-type DVD, a first embodiment of the disc recording medium of the invention. The disc recording medium 100 comprises a first disc substrate 21 having a thickness of 0.6 mm, which is formed by injection-molding a synthetic resin material, for example, a transparent polycarbonate resin in a mold that contains a stamper with information recorded thereon as a fine concavo-convex pattern and which has the concavo-convex pattern transferred from the stamper, and a second disc substrate 23 having a thickness of 0.6 mm, which is formed of a synthetic resin material (e.g., polycarbonate resin) containing a colorant material therein and which is adhered to the first disc substrate 21. On the first substrate 21, formed is a recording layer 25 of the fine concavo-convex pattern transferred from the stamper.

The disc recording medium 100 is so designed that the data recorded on the recording layer 25 can be read out by irradiating the side of the transparent first substrate 21 with laser light 29 from a light pickup device 27 and detecting the laser light 29 reflected on the recording layer 25 by the light pickup device 27.

In the disc recording medium 100 of this embodiment, the second substrate is formed of a colored synthetic resin material. Therefore, it is easy to make every disc recording medium 100 have its own appearance differing from the others by laminating any one of second substrates 23 having different colors onto the first substrate 21 of the same type, and every disc recording medium 100 thus produced can be readily differentiated from the others. In addition, since the second substrate 23 is colored, background color printing on the discs in a printing step can be omitted, and the printing step can be finished only by printing the necessary information thereon. The printing frequency can be reduced or the printing operation can be completely omitted, and the process of fabricating the recording discs can be simplified.

The disc recording medium of this embodiment illustrated herein is one example of a type having one recording layer. Not limited to this, the invention is applicable to disc recording media of any other types in which the substrate opposite to that that is irradiated with light (or a specific layer portion of the substrate) is colored, for example, those of a type having two recording layers and those of a type for photomagnetic recording or reading.

Next described is a modification of this embodiment, a disc recording medium 200.

Figure 2:
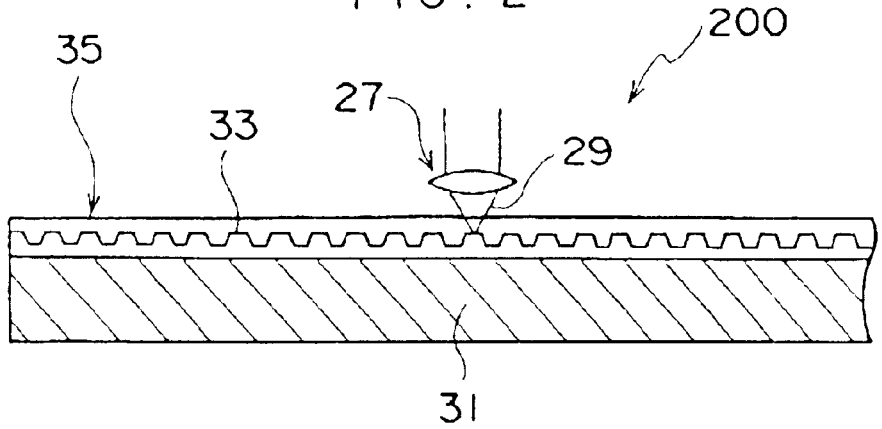
FIG. 2 is a vertical cross-sectional view showing a modification of the first embodiment of the optical information recording medium of the present invention.

FIG. 2 is a vertical cross-sectional view of the modification of this embodiment, the disc recording medium 200. The disc recording medium 200 comprises a substrate 31 and a sheet 35 having a recording layer 33 attached to one surface of the substrate 31. This is irradiated with laser light 29 from a light pickup device 27 toward the sheet 35, the laser light 29 reflected on the recording layer 33 is detected by the light pickup device 27, and the data recorded on the recording layer 33 are thereby read out.

In this modification, the substrate 31 is formed of a disc of a synthetic resin material (for example, polycarbonate resin) that contains a colorant material. Therefore, sheets 35 of which the recording layer 33 has the same contents recorded thereon may be individually laminated onto any one of substrates 31 of different colors, and it is easy to make every disc recording medium 200 have its own appearance differing from the others. In addition, since the substrate 31 is colored, background color printing on the discs in a printing step can be omitted like in the above, and therefore, the printing frequency can be reduced or the printing operation can be completely omitted, and the process of fabricating the recording discs can be simplified.

Next described is the second embodiment of the disc recording medium of the invention.

The disc recording medium of this embodiment is fabricated by changing the monochromatic color of the second substrate 23 of the disc recording medium of the first embodiment (see FIG. 1) and that of the substrate 31 of the disc recording medium the modification of the first embodiment into a mixed color. In this embodiment, the multi-color second substrate 23 or substrate 31 is combined with a recording layer attached thereto to construct the intended disc recording medium, like in the above. For forming the multi-color substrate, for example, known is a multi-color injection molding method. The multi-color injection molding method is employed as one example in this embodiment, and this is described below.

Figure 3A:
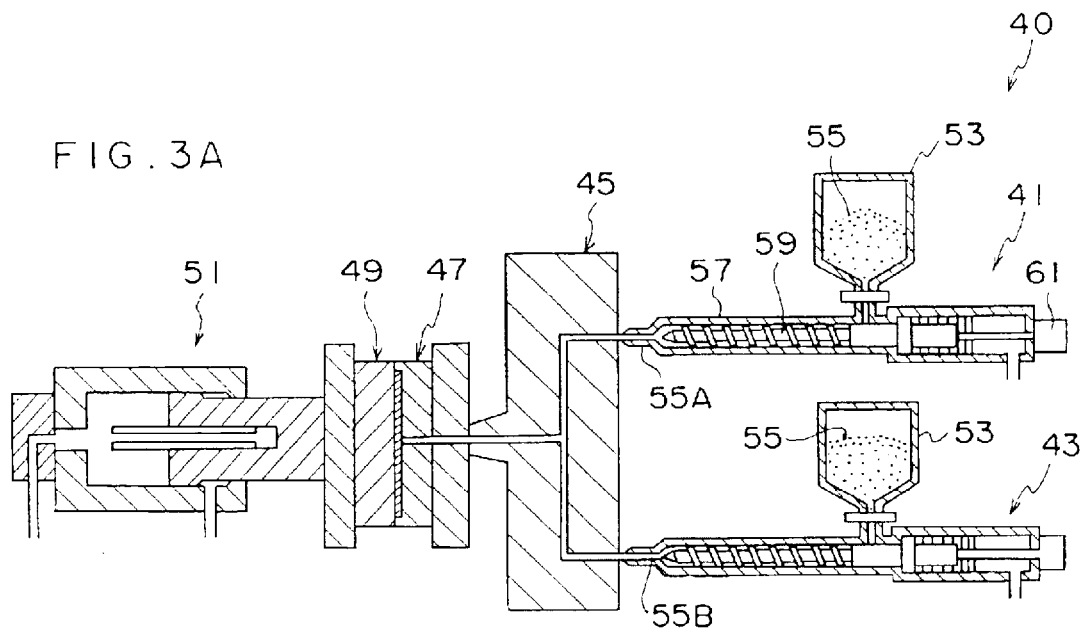
FIG. 3A and FIG. 3B are cross-sectional views showing a multi-color injection molding device for molding two color resins in a second embodiment of the present invention.
Figure 3B:
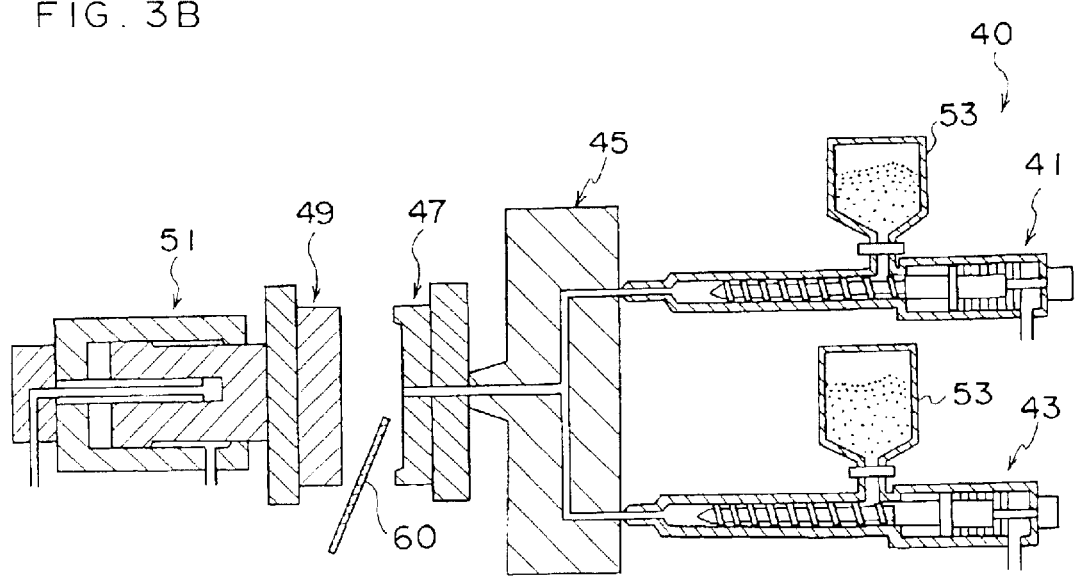

FIG. 3A and FIG. 3B are cross-sectional views showing a multi-color injection molding device 40 for molding two color resin. The multi-color injection molding device 40 essentially comprises two injectors 41, 43; a mixer 45 in which the hot synthetic resin materials from the injectors 41, 43 are mixed; a fixed mold 47 and a movable mold 49, between which the cavity is filled with the mixed resin material from the mixer 45; and a driving mechanism 51 for moving the movable mold 49. The injectors 41, 43 have the same structure, each equipped with a hopper 53 into which the starting synthetic resin material 55 is put; an injection cylinder 57 in which the synthetic resin material 55 from the hopper 53 is heated; a screw 59 for delivering the synthetic resin material 55 to the tip of the injection cylinder 57; and a driving motor 61 for rotating the screw 59.

In the multi-color injection molding device 40, the two synthetic resin materials are fed into the mixer 45 from the injectors 41, 43 via the respective inlet ducts, mixed in their flow channel, and then injected under high pressure into the cavity between the fixed mold 47 and the movable mold 49, as in FIG. 3A. After the mixed resin material in the cavity has been solidified, the movable mold 49 is moved backward by the driving mechanism 51, and the molded substrate 60 (this corresponds to the second substrate 23 in FIG. 1, or the substrate 31 in FIG. 2) is taken out.

Next described are methods of using the multi-color injection molding device 40 for forming substrates for the disc recording medium of the invention.

Figure 4A:
FIG. 4A and FIG. 4B are the appearances of substrates with an irregular pattern of entangled different color synthetic resin materials forming a marble pattern thereon.
Figure 4B:

First Method of Substrate Formation:

Synthetic resin pellets 55A, 55B of different colors are put into the hopper 53 of the injector 41 and the hopper 53 of the injector 43, respectively; and these pellets 55A, 55B are simultaneously fed into the cavity of the molds 47, 49, through the injection cylinders 57 and via the mixer 45. With that, the synthetic resin materials of different colors are mixed to form an irregular marble pattern as in FIG. 4A of FIG. 4B. The marble pattern changes every time when the resin pellets 55A, 55B of different colors are fed into the mold cavity, thereby to be an intrinsic pattern as in FIG. 4A or FIG. 4B. Therefore, substrates of different patterns can be formed in such a manner by merely repeating the injection molding operation as herein, not artificially changing the substrate design.

If such marble patterns are formed in a printing method, the pattern change and the halftone design will be the factors to increase the production costs, and the increase in the production steps and also the increase in the production costs will be inevitable. However, according to the production method proposed herein, it is easy to delicately control the mixed color tone of disc substrates, and it is easy to produce good disc substrates of beautiful appearances. Using the thus-formed substrates enhances the commercial value of the recording discs produced.

Second Method of Substrate Formation:

A transparent synthetic resin material such as transparent polycarbonate resin is fed into the hopper 53 of the injector 41, while, on the other hand, a colored synthetic resin material is into the hopper 53 of the injector 43. In this case, the injector 41 serves as a main unit, and the injector 43 as a sub-unit. The resin supply ratio from the main unit is made larger than that from the sub-unit, and the two resin materials are injection-molded in that condition. This gives a substrate of a marble pattern in which the background of the transparent synthetic resin material is mixed with the additive of the colored synthetic resin material. The monochromatic substrate thus formed has such an intrinsic marble pattern.

Third Method of Substrate Formation:

Synthetic resin pellets 55A, 55B of different colors are put into the hopper 53 of the injector 41 and the hopper 53 of the injector 43, respectively; and these pellets 55A, 55B are simultaneously fed into the cavity of the molds 47, 49, through the injection cylinders 57 and via the mixer 45 while the flow ratio of the pellets 55A, 55B is continuously varied. With that, the synthetic resin materials of different colors are mixed while their blend ratio is varied, and substrates of different marble patterns are formed. The overall lightness of the substrates thus formed can be varied in any desired manner. For example, when the synthetic resin material 55A is dark such as deep-blue and the synthetic resin material B is light such as yellow and when the blend ratio of the synthetic resin material 55A is increased, the overall lightness of the substrates formed will be low; but on the contrary, when the blend ratio of the synthetic resin material 55B is increased, the overall lightness of the substrates formed will be high. Accordingly, the substrates formed in this method may have different patterns and different degree of lightness intrinsic to them.

Even when a single injection molding device having a single injector is used in place of the multi-color injection molding device having the two injectors 41, 43, it is also possible to individually differentiate the recording discs produced in the same manner as herein.

Fourth Method of Substrate Formation:

Synthetic resin materials of different colors are fed into the hoppers of the injectors at predetermined intervals in a predetermined order so that the colors of the synthetic resin materials to be fed into the injection cylinders from the hoppers are changed in order. In this method, a mixture of at least two synthetic resin materials of different colors is injected into the cavity of the molds. In that manner, synthetic resin materials of different colors are mixed in a varying blend ratio in every injection molding operation, and are molded into substrates of different colors. Therefore, the color of the substrates molded in the method can be successively varied, for example, from red to orange, to yellow, to yellowish green, to green, to . . . , and the method gives substrates of different colors that vary in every injection molding operation. Depending on the condition of injection molding, substrates of two-color marble patterns can also be formed in the method.

For color change in conventional injection molding to give substrates of a predetermined color, those of mixed colors are inevitably formed and they are rejected and discarded. However, according to the molding method of this embodiment, the color of the products can be changed at any time with no trouble of color mixing in the products produced. Therefore, the method does not give products of mixed colors to be rejected, and it saves the processing time and reduces the production costs.

For coloring the synthetic resin materials, any known coloring methods are employable. For it, for example, there are known a dry coloring method that comprises putting natural resin pellets and a powdery colorant into a drum mixer and rotating the drum mixer to thereby make the powdery colorant adhered to the resin pellets; and a master batch method that comprises blending a master batch of colorant pellets (this is prepared by mixing a starting resin with a high-concentration pigment of a desired color) with natural resin pellets in a desired ratio to thereby make the resin pellets colored with the colorant.

As described hereinabove, the substrate of the disc recording material of the invention opposite to the side thereof that is irradiated with light is formed of a colorant-containing synthetic resin material. Therefore, the invention makes it possible to fabricate recording discs of different beautiful appearances that can be individually differentiated from the others, and makes it possible to increase the commercial value of the recording discs. In the process of producing the recording discs in the invention, the load in the printing step can be reduced and the production costs are therefore reduced.

EXAMPLES

The invention is described in more detail with reference to the following Examples, but it is to be understood that the invention is not limited to the Examples.

Example 1

On the grooved surface of an injection-molded polycarbonate resin (Teijin's polycarbonate, PANLITE AD5503™) substrate having a thickness of 1.1 mm and a diameter of 120 mm and having a spiral groove (depth, 100 nm; width, 0.11 $\mu$m; track pitch, 300 nm), Ag was sputtered to form thereon a reflective layer having a thickness of 100 nm. On the other hand, 20 g of ORASOL BLUE GN (phthalocyanine dye by Ciba Speciality Chemicals) was added to 1 liter of 2,2,3,3-tetrafluoropropanol, and ultrasonically processed for 2 hours to dissolve it to prepare a dye coating solution. The dye coating solution was applied onto the reflective layer by spin coating at a varying speed of from 300 to 4000 rpm at 23° C. and 50% RH. This was stored at 23° C. and 50% RH for 1 hour to form a recording layer (thickness, 100 nm).

Next, a UV-curable adhesive (Dai-Nippon Ink and Chemical's SD-347) was applied onto the recording layer by spin coating at 100 to 300 rpm, and a cellulose triacetate film (FUJITAC by Fuji Photo Film, having a thickness of 0.08 mm) containing 10% by weight of a UV absorbent, benzotriazole was put over it. This was rotated by a spin coater at a varying speed of from 300 to 400 rpm to fully spread the UV-curable adhesive, and irradiated with UV light from a UV lamp to cure the adhesive. This is a sample of the optical information recording medium of the invention.

The cellulose triacetate film was prepared by adding benzotriazole to a cellulose triacetate solution, casting the solution on a band and drying it thereon to remove the solvent.

Example 2

Ag was sputtered onto the same substrate as in Example 1 to form thereon a reflective layer having a thickness of 100 nm. Next, a dielectric layer of ZnS—$SiO_2$ having a thickness of 90 nm was formed thereon also by sputtering.

20 g of FOM-561 ORASOL BLUE (phthalocyanine dye by Wako Pure Chemical Industries) was added to 1 liter of dibutyl ether, and ultrasonically processed for 2 hours to dissolve it to prepare a dye coating solution. The dye coating solution was applied onto the dielectric layer by spin coating at a varying speed of from 300 to 4000 rpm at 23° C. and 50% RH. This was stored at 23° C. and 50% RH for 1 hour to form a recording layer (thickness, 100 nm). Next, a light-transmitting layer of $SiO_2$ having a thickness of 90 nm was formed on the recording layer by sputtering, and a UV-curable adhesive (Dai-Nippon Ink and Chemical's SD-661) was applied onto the light-transmitting layer by spin coating at 100 to 300 rpm.

Next, a polycarbonate film (thickness, 0.08 mm) containing 10% by weight of benzotriazole was put over the light-transmitting layer. This was rotated by a spin coater at a varying speed of from 300 to 4000 rpm to fully spread the adhesive, and pulse-irradiated with UV light from a UV lamp to cure the adhesive. This is a sample of the optical information recording medium of the invention.

The dye was added to the polycarbonate film in the same manner as in Example 1.

Example 3

Ag was sputtered onto the same substrate as in Example 1 to form thereon a reflective layer having a thickness of 100 nm. On the other hand, 20 g of ORASOL BLUE GN (phthalocyanine dye by Ciba Speciality Chemicals) was added to 1 liter of 2,2,3,3-tetrafluoropropanol, and ultrasonically processed for 2 hours to dissolve it to prepare a dye coating solution. The dye coating solution was applied onto the reflective layer by spin coating at a varying speed of from 300 to 4000 rpm at 23° C. and 50% RH. This was stored at 23° C. and 50% RH for 1 hour to form a recording layer (thickness, 100 nm).

Next, a UV-curable adhesive (Dai-Nippon Ink and Chemical's SD-347) was applied onto the recording layer by spin coating at 100 to 300 rpm, and a cellulose triacetate film (FUJITAC by Fuji Photo Film, having a thickness of 0.08 mm) containing 20% by weight of a dye of formula (1) mentioned above was put over it. This was rotated by a spin coater at a varying speed of from 300 to 4000 rpm to fully spread the adhesive, and irradiated with UV light from a UV lamp to cure the adhesive. This is a sample of the optical information recording medium of the invention.

The dye of formula (1) used herein is a commercial product. This was added to the cellulose triacetate film in the same manner as in Example 1.

Example 4

Ag was sputtered onto the same substrate as in Example 1 to form thereon a reflective layer having a thickness of 100 nm. On the other hand, 20 g of FOM-561 ORASOL BLUE (phthalocyanine dye by Wako Pure Chemical Industries) was added to 1 liter of dibutyl ether, and ultrasonically processed for 2 hours to dissolve it to prepare a dye coating solution. The dye coating solution was applied onto the reflective layer by spin coating at a varying speed of from 300 to 4000 rpm at 23° C. and 50% RH. This was stored at 23° C. and 50% RH for 1 hour to form a recording layer (thickness, 100 nm).

Next, a light-transmitting layer of $SiO_2$ having a thickness of 90 nm was formed on the recording layer by sputtering. A UV-curable adhesive (Dai-Nippon Ink and Chemical's SD-661) was applied onto the light-transmitting layer by spin coating at 100 to 300 rpm, and a polycarbonate film (thickness, 0.08 mm) containing 20% by weight of a dye of formula (2) mentioned above was put over it. This was rotated by a spin coater at a varying speed of from 300 to 4000 rpm to fully spread the adhesive, and pulse-irradiated with UV light from a UV lamp to cure the adhesive. This is a sample of the optical information recording medium of the invention.

The dye of formula (2) used herein is a commercial product. This was added to the polycarbonate film in the same manner as in Example 1.

Example 5

Ag was sputtered onto the same substrate as in Example 1 to form thereon a reflective layer having a thickness of 100 nm. On the other hand, 20 g of ORASOL BLUE GN (phthalocyanine dye by Ciba Speciality Chemicals) was added to 1 liter of 2,2,3,3-tetrafluoropropanol, and ultrasonically processed for 2 hours to dissolve it to prepare a dye coating solution. The dye coating solution was applied onto the reflective layer by spin coating at a varying speed of from 300 to 4000 rpm at 23° C. and 50% RH. This was stored at 23° C. and 50% RH for 1 hour to form a recording layer (thickness, 100 nm).

Next, a UV-curable adhesive (Dai-Nippon Ink and Chemical's SD-347) was applied onto the recording layer by spin coating at 100 to 300 rpm, and a cellulose triacetate film (FUJITAC by Fuji Photo Film, having a thickness of 0.08 mm) containing 20% by weight of benzotriazole and 20% by weight of a dye of formula (1) mentioned above was put over it. This was rotated by a spin coater at a varying speed of from 300 to 4000 rpm to fully spread the adhesive, and irradiated with UV light from a UV lamp to cure the adhesive. This is a sample of the optical information recording medium of the invention.

Benzotriazole and the dye of formula (1) were added to a solution of cellulose triacetate, and the solution was formed into the film containing the two.

Example 6

Ag was sputtered onto the same substrate as in Example 1 to form thereon a reflective layer having a thickness of 100 nm. Next, a dielectric layer of ZnS—$SiO_2$ having a thickness of 90 nm was formed thereon also by sputtering.

20 g of FOM-561 ORASOL BLUE (phthalocyanine dye by Wako Pure Chemical Industries) was added to 1 liter of dibutyl ether, and ultrasonically processed for 2 hours to dissolve it to prepare a dye coating solution. The dye coating solution was applied onto the dielectric layer by spin coating at a varying speed of from 300 to 4000 rpm at 23° C. and 50% RH. This was stored at 23° C. and 50% RH for 1 hour to form a recording layer (thickness, 100 nm). Next, a light-transmitting layer of $SiO_2$ having a thickness of 90 nm was formed on the recording layer by sputtering, and a UV-curable adhesive (Dai-Nippon Ink and Chemical's SD-661) was applied onto the light-transmitting layer by spin coating at 100 to 300 rpm.

Next, a polycarbonate film (thickness, 0.08 mm) containing 10% by weight of benzotriazole and 10% by weight of a dye of formula (2) mentioned above was put over the light-transmitting layer. This was rotated by a spin coater at a varying speed of from 300 to 4000 rpm to fully spread the adhesive, and pulse-irradiated with UV light from a UV lamp to cure the adhesive. This is a sample of the optical information recording medium of the invention.

Benzotriazole and the dye of formula (2) were added to the polycarbonate film while the film was formed.

Comparative Example 1

Ag was sputtered onto the same substrate as in Example 1 to form thereon a reflective layer having a thickness of 100 nm.

On the other hand, 20 g of ORASOL BLUE GN (phthalocyanine dye by Ciba Speciality Chemicals) was added to 1 liter of 2,2,3,3-tetrafluoropropanol, and ultrasonically processed for 2 hours to dissolve it to prepare a dye coating solution. The dye coating solution was applied onto the reflective layer by spin coating at a varying speed of from 300 to 4000 rpm at 23° C. and 50% RH. This was stored at 23° C. and 50% RH for 1 hour to form a recording layer (thickness, 100 nm).

Next, a UV-curable adhesive (Dai-Nippon Ink and Chemical's SD-347) was applied onto the recording layer by spin coating at 100 to 300 rpm, and a cellulose triacetate film (FUJITAC by Fuji Photo Film, having a thickness of 0.08 mm) was put over it. This was rotated by a spin coater at a varying speed of from 300 to 4000 rpm to fully spread the adhesive, and pulse-irradiated with UV light from a UV lamp to cure the adhesive. This is a comparative sample.

Evaluation of Optical Information Recording Media:

Recording/Reading Test

The optical information recording media obtained in Examples 1 to 6 and Comparative Example 1 were stored under the condition mentioned below. A 3T signal was recorded on these, using DDU-1000 (by Pulsetec) equipped with a 405 nm laser, and C/N was measured. The results are given in Table 1.

Condition for Storage

Using a fade meter by Suga Test Instruments, each sample was irradiated with light (wavelength: 350 to 1000 nm) for 48 hours through its cover layer. The quantity of light from the tester was 335 W/m$^2$, the temperature in the room was 60° C., and the humidity therein was 75% RH.

On the other hand, the samples were stored in a thermo-box at 80° C. and 85% RH for 48 hours.

TABLE 1

|  | Before Stored | After Faded for 48 hours | After Stored in Thermo-box for 48 hours |
| --- | --- | --- | --- |
| Example 1 | 55 db | 52 db | 53 db |
| Example 2 | 45 db | 41 db | 42 db |
| Example 3 | 55 db | 50 db | 52 db |
| Example 4 | 45 db | 40 db | 41 db |
| Example 5 | 55 db | 54 db | 55 db |
| Example 6 | 45 db | 44 db | 44 db |
| Comparative Example 1 | 55 db | 15 db | 20 db |

As in Table 1, the samples of the optical information recording medium of the invention obtained in Examples 1 to 6 all had stable recording-reading characteristics even after faded and after stored in a thermo-box.

On the other hand, the recording-reading characteristics of the comparative sample obtained in Comparative Example 1 lowered after faded and after stored in a thermo-box.

The invention provides an optical information recoding medium having stable recording and reading characteristics and having good storage stability including light resistance and heat resistance by preventing the colorants in the recording layer therein from being decomposed.

In addition, the invention makes it possible to fabricate a disc recording medium in which the substrate opposite to the side thereof that is irradiated with light contains a colorant material. According to the invention, therefore, it is easy to fabricate recording discs of different appearances that can be individually differentiated from the others. The invention makes it possible to reduce the production costs of the recording discs and to increase the commercial value thereof.

What is claimed is:

1. An optical information recording medium comprising a substrate having successively disposed thereon at least a light-reflective layer, a recording layer on which information is recorded by laser light of a wavelength no longer than 500 nm, and a cover layer containing at least one of a UV absorbent that blocks out light of a wavelength no longer than 400 nm and a dye that blocks out light of a wavelength no shorter than 500 nm.

2. The optical information recording medium of claim 1, wherein the substrate comprises at least one of amorphous polyolefins and polycarbonates.

3. The optical information recording medium of claim 1, wherein the substrate comprises a polycarbonate.

4. The optical information recording medium of claim 1, wherein the light-reflective layer comprises at least one selected from the group consisting of Cr, Ni, Pt, Cu, Ag, Au, Al and stainless steel.

5. The optical information recording medium of claim 1, wherein the light-reflective layer comprises at least one selected from the group consisting of Ag, Au and Al.

6. The optical information recording medium of claim 1, wherein the light-reflective layer comprises at least one of Ag and Au.

7. The optical information recording medium of claim 1, wherein the recording layer comprises at least a dye selected from the group consisting of cyanine dyes, oxonole dyes, metal complex dyes, azo dyes and phthalocyanine dyes.

8. The optical information recording medium of claim 1, wherein the recording layer comprises a compound selected from the group consisting of cyanine compounds, aminobutadiene compounds, benzotriazole compounds and phthalocyanine compounds.

9. The optical information recording medium of claim 1, wherein the cover layer comprises a substance selected from the group consisting of polycarbonates, acrylic resins, vinyl chloride-based resins, epoxy resins, amorphous polyolefins, polyesters and cellulose triacetate.

10. The optical information recording medium of claim 1, wherein the cover layer comprises a substance selected from the group consisting of polycarbonates, polymethyl methacrylate and polyvinyl chloride.

11. The optical information recording medium of claim 1, wherein the UV absorbent is selected from the group consisting of benzothiazoles, tetrazaindenes, thiouracils, benzotriazoles and derivatives thereof.

12. The optical information recording medium of claim 1, wherein the dye that blocks out light of a wavelength no shorter than 500 nm is selected from the group consisting of phthalocyanine dyes, cyanine dyes, merocyanine dyes, azo dyes, imnionium dyes, diimmonium dyes, pyrylium/thiopyrylium dyes, azulenium dyes, squalilium dyes, Ni metal complex dyes, Cr metal complex dyes, naphthoquinone dyes, anthraquinone dyes, indophenol dyes, indaniline dyes, tnphenylmethane dyes, triallymethane dyes, aluminum diimonium dyes and nitroso compounds.

13. The optical information recording medium of claim 1, wherein the dye that blocks out light of a wavelength no shorter than 500 nm is represented by the following structural formula (1):

Structural Formula (1)

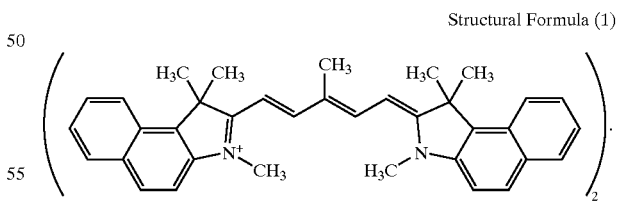

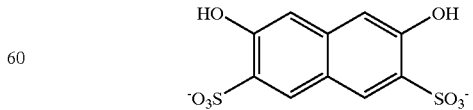

14. The optical information recording medium of claim 1, wherein the dye that blocks out light of a wavelength no shorter than 500 nm is represented by the following structural formula (2):

Structural Formula (2)

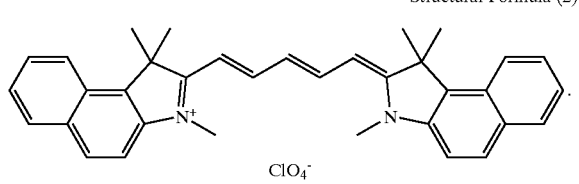

ClO$_4^-$

15. An optical information recording medium having a substrate that is irradiated with light to record information on a recording layer on the substrate and to read the recorded information, and another substrate disposed opposite to the substrate that is irradiated with light, wherein the another substrate contains a colorant material and wherein said substrate that is irridiated with light to record information on the recording layer and to read the recorded information has successively disposed thereon at least a light-reflective layer, the recording layer on which information is recorded by laser light of a wavelength no longer than 500 nm, and a cover layer containing at least one of a UV absorbent that blocks out light of a wavelength no longer than 400 nm and a dye the blocks out light of a wavelength no shorter than 500 nm.

16. The optical information recording medium of claim 15, wherein the colorant material-containing substrate comprises a mixture of synthetic resin materials colored at least two different colors.

17. The optical information recording medium of claim 15, wherein the UV absorbent is selected from the group consisting of benzothiazoles, tetrazaindenes, thiouracils, benzotriazoles and derivatives thereof.

18. The optical information recording medium of claim 15, wherein the dye that blocks out light of a wavelength no shorter than 500 nm is selected from the group consisting of phthalocyanine dyes, cyanine dyes, merocyanine dyes, azo dyes, immonium dyes, diimonium dyes, pyrylium/thiopyrylium dyes, azulenium dyes, squalilium dyes, Ni metal complex dyes, Cr metal complex dyes, naphthoquinone dyes, anthraquinone dyes, indophenol dyes, indaniline dyes, triphenylmethane dyes, triallylmethane dyes, aluminum diimmonium dyes and nitroso compounds.

* * * * *